(12) United States Patent
Sharma et al.

(10) Patent No.: US 7,311,497 B2
(45) Date of Patent: *Dec. 25, 2007

(54) MANUFACTURABLE AND INSPECTABLE MICROCIRCUITS

(75) Inventors: Om Parkash Sharma, South Windsor, CT (US); Frank Cunha, Avon, CT (US); Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/217,703

(22) Filed: Aug. 31, 2005

(65) Prior Publication Data

US 2007/0237638 A1    Oct. 11, 2007

(51) Int. Cl.
*F01D 5/18* (2006.01)

(52) U.S. Cl. ............... 416/97 A; 416/232; 29/889.721; 29/889.7

(58) Field of Classification Search .................. 415/95, 415/96 R, 97 A, 96 A, 231 R, 232, 233; 29/889, 889.22, 889.7, 889.72, 889.721, 29/889.722

See application file for complete search history.

(56) References Cited

U.S. PATENT DOCUMENTS 5,392,515 A * 2/1995 Auxier et al. .......... 29/889.721

* cited by examiner

*Primary Examiner*—Edward K. Look
*Assistant Examiner*—Dwayne J White
(74) *Attorney, Agent, or Firm*—Bachman & LaPointe

(57) ABSTRACT

A method for manufacturing a turbine engine component comprises the steps of forming a first half of an airfoil portion of the turbine engine component and forming a first cooling microcircuit having at least one passageway on an exposed internal wall of the first half of the airfoil portion. The method further comprises forming a second half of the airfoil portion of said turbine engine component, forming a second cooling microcircuit having at least one passageway on an exposed internal wall of the second half of the airfoil portion, and placing the first half in an abutting relationship with the second half after the cooling microcircuits have been formed and inspected.

19 Claims, 4 Drawing Sheets

MANUFACTURABLE AND INSPECTABLE MICROCIRCUITS

BACKGROUND OF THE INVENTION (1) Field of the Invention

The present invention relates to a method for manufacturing turbine engine components having an airfoil portion with a cooling microcircuit and a turbine engine component formed thereby.

(2) Prior Art

Turbine engine components, such as high pressure turbine blade airfoils, encounter harsh environments and are subject to extremely hot gases from other components such as burners. The airfoil portions of these components experience a varying thermal load. As a result, the airfoil portions need to be cooled locally. The mechanisms for cooling the airfoil portions vary from design to design but there is a certain optimum arrangement that minimizes cooling flow.

Today, cooling microcircuits in the airfoil portions of turbine engine components may be formed using refractory metal cores in a double wall design. The refractory metal core material has an elevated melting temperature, making it desirable for processing during investment casting before being leached-out and forming internal microcircuit passageways within a wall of the cast component. While this technique is effective to form very desirable cooling microcircuits, it is difficult to inspect the microcircuits thus formed.

SUMMARY OF THE INVENTION

Accordingly, one aim of the present invention is to provide a method for forming a turbine engine component having an airfoil portion with cooling microcircuits that can be inspected without great difficulty.

In accordance with the present invention, a method for manufacturing a turbine engine component having an airfoil portion is provided. The method broadly comprises the steps of forming a first half of an airfoil portion of the turbine engine component and forming a first cooling microcircuit having at least one passageway on an exposed internal wall surface of the first half of the airfoil portion. The method further comprises forming a second half of the airfoil portion of the turbine engine component, forming a second cooling microcircuit having at least one passageway on an exposed internal wall surface of the second half of the airfoil portion, and placing the first half in an abutting relationship with the second half after the microcircuits have been formed and inspected.

The method of the present invention is quite advantageous in that an airfoil portion for a turbine engine component, such as a high pressure turbine blade, can be easily manufactured with microcircuit type cooling features.

Further, in accordance with the present invention, a turbine engine component broadly comprises an airfoil portion having a first airfoil half and a second airfoil half in an abutting relationship, and each of said first airfoil half and said second airfoil half having a cooling microcircuit feature on an internal wall surface.

Other details of the manufacturable and inspectable microcircuits of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
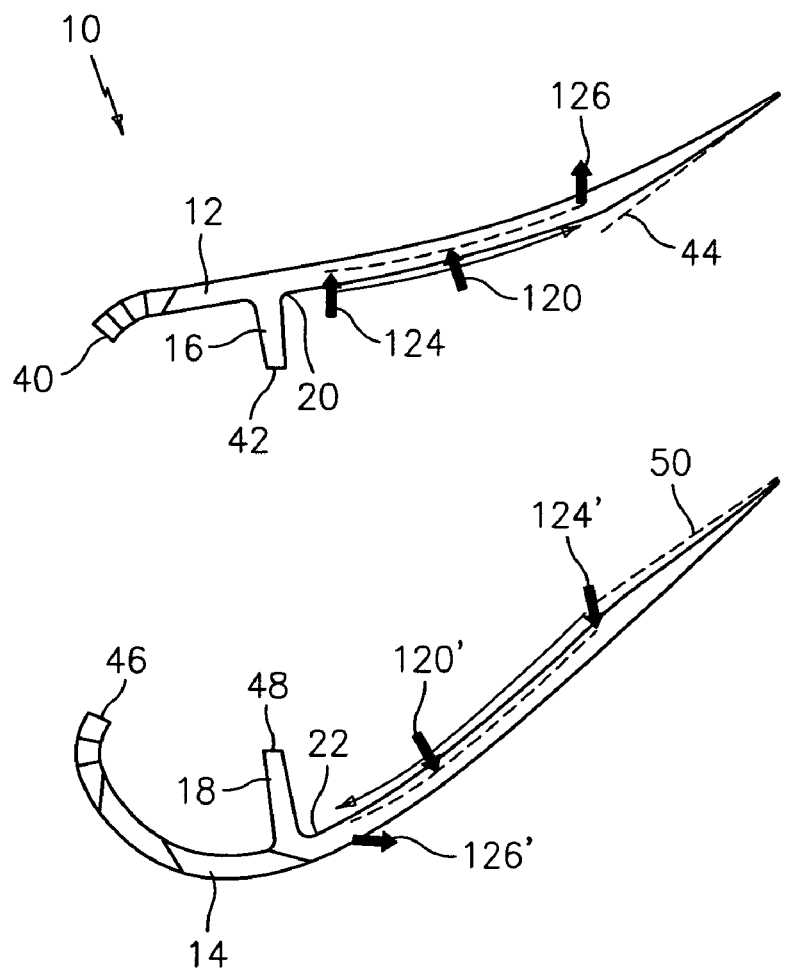
FIG. 1 illustrates two airfoil halves formed in accordance with the present invention.

Referring now to the drawings, FIG. 1 illustrates an airfoil portion 10 of a turbine engine component, such as a high pressure turbine blade. The airfoil portion 10 has a first half 12 and a second half 14. The airfoil halves 12 and 14 may have any desired shape and may include internal structures, such as ribs 16 and 18. As will be discussed hereinafter, the airfoil halves 12 and 14 are formed so that respective internal wall surfaces 20 and 22 are exposed.

The airfoil halves 12 and 14 may be cast in any suitable manner known in the art from any suitable material known in the art. For example, the airfoil halves 12 and 14 may be formed from a nickel-based, cobalt-based, iron-based, or titanium-based alloy material.

Figure 2:
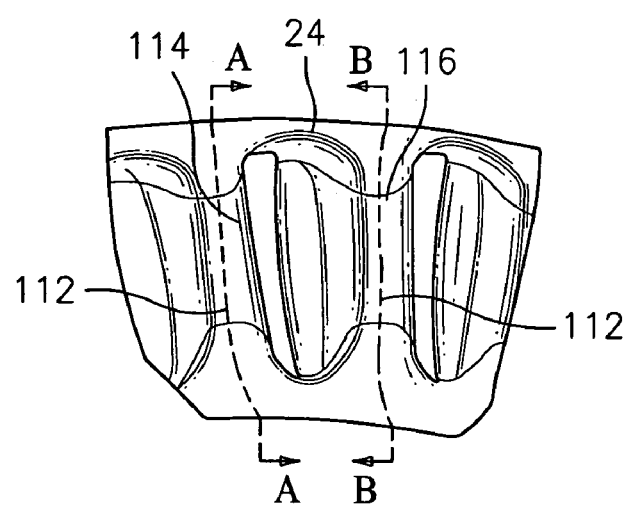
FIG. 2 illustrates a casting unit for forming the airfoil halves of the present invention.
Figure 5:
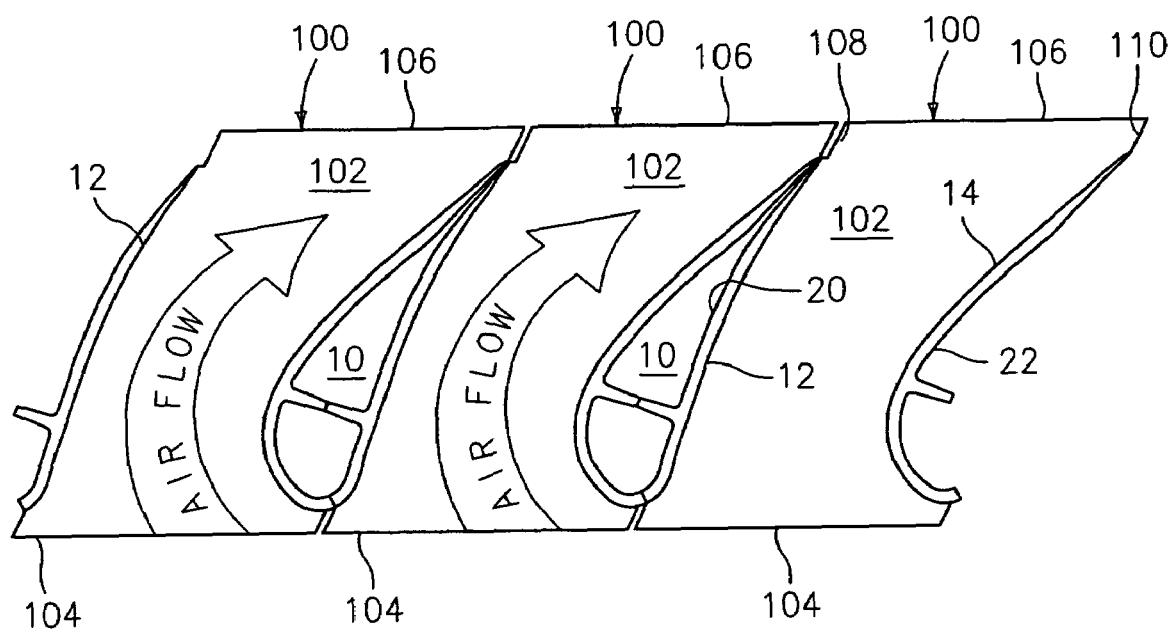
FIG. 5 illustrates a structure which may be formed using the casting unit of FIG. 2 and which may be used to form a turbine engine component.

In a preferred embodiment of the present invention, the airfoil halves 12 and 14 are formed using a casting unit 24 such as that shown in FIG. 2. The casting unit 24 is unique in that it casts a structure 100, such as that shown in FIG. 5, from which the turbine engine component can be formed. The structure 100 may include a platform 102 having a leading edge 104, a trailing edge 106, a first side edge 108, and a second side edge 110. The structure 100 also may include the first airfoil half 12 along the edge 108 and the second airfoil half 14 along the edge 110. The structure 100 may also have features such as an attachment portion (not shown) formed on an underside of the platform 102 and fillets 112 formed between an exterior surface 114 or 116 of a respective one of the airfoil halves 12 and 14 and a surface of the platform 102. One of the advantages to the structure 100 is that the internal wall surfaces 20 and 22 are exposed prior to the halves 12 and 14 of adjacent ones of the structures 100 being joined together. Because the internal wall surfaces 20 and 22 are exposed, one or more cooling microcircuits can be easily formed on the internal wall surfaces 20 and 22. The shape of the microcircuits can be selected to optimize the cooling needs of the airfoil portion 10 in its intended environment.

To form the structures 100, the casting unit 24 is separable along the lines A-A and B-B which define the split line 26 for the airfoil portion 10. The casting unit 24 is different from prior art casting units wherein the airfoil portion was formed without any split lines. Instead, there was a parting line in a center portion of the platform. Forming the turbine component structures in this manner was disadvantageous in that there were a plurality of leakage paths between adjacent platform portions which required the use of numerous seals.

This disadvantage is overcome by the casting unit 24 used to form the structures 100 because the platform portions are now cast as a single unit eliminating the need for seals as it is configured today along the platform edges. In use, the casting units 24 may be filled with a molten material in any suitable manner known in the art. That is, create the mold with wax, shell the mold, liquefy the wax, and pour the liquid metal in the pattern (empty spaces) during casting.

Figure 3:
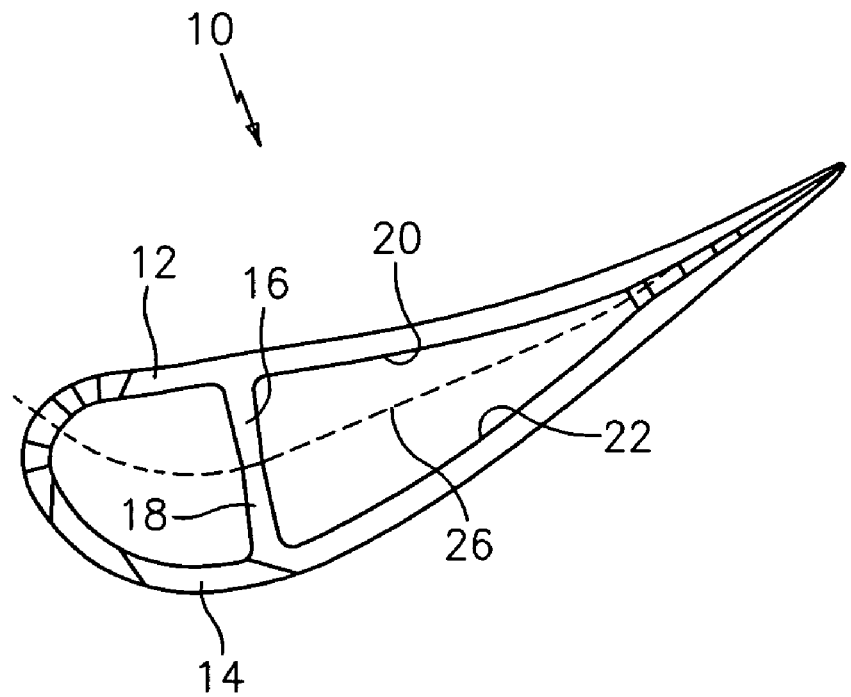
FIG. 3 illustrates the split line in the casting unit of FIG. 2.
Figure 4:
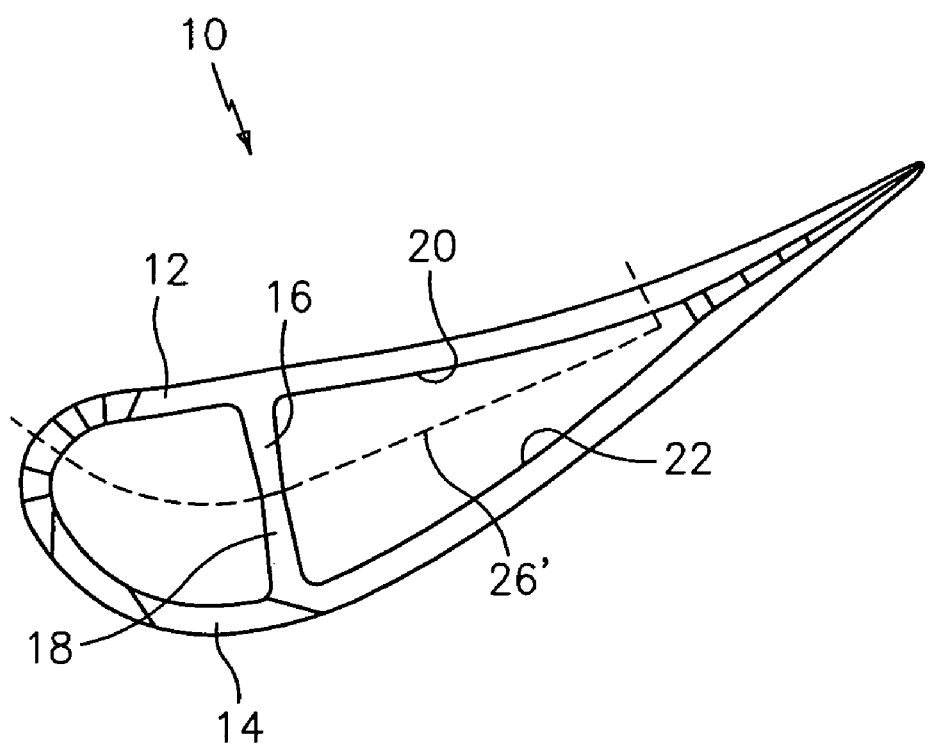
FIG. 4 illustrates an alternative split arrangement which can be used with the casting unit of FIG. 2.

FIG. 3 illustrates one form of a split line 26 which can be used in the casting units 24 in carrying out the present invention to form the airfoil halves 12 and 14. FIG. 4 illustrates an alternative embodiment of a split line 26' which can be used in the casting units 24 carrying out the present invention to form the airfoil halves 12 and 14.

Figure 6:
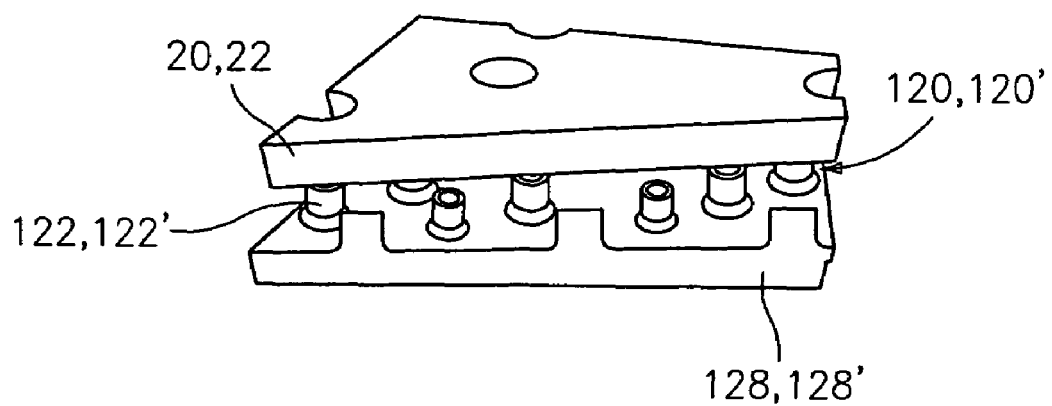
FIG. 6 illustrate a cooling fluid microcircuit which can be imbedded into the walls of each airfoil portion.
Figure 7A:
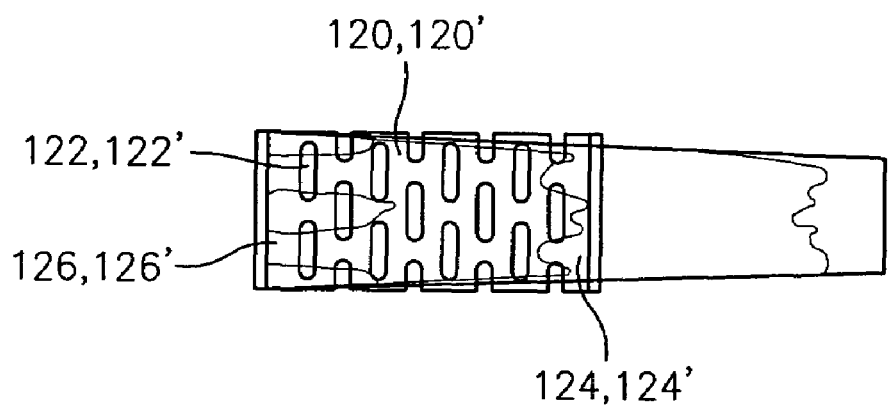
FIGS. 7A and 7B illustrate various features which can be used in the cooling fluid microcircuit of FIG. 6.
Figure 7B:
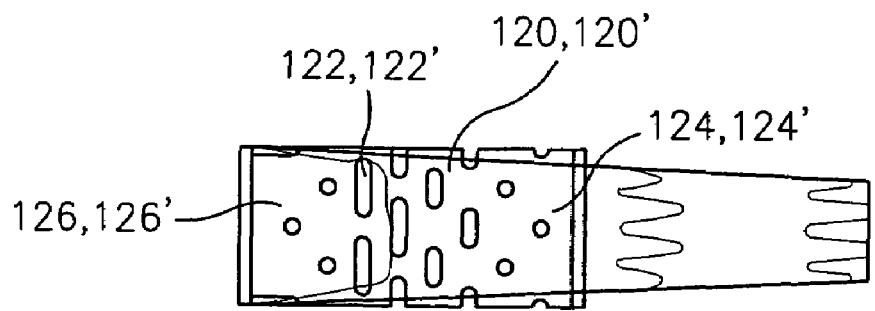

Referring to FIGS. 1 and 6, a first cooling microcircuit 120 can be formed on the internal wall surface 20 using any suitable technique known in the art. For example, the microcircuit 120 can be a cast structure if desired where a number of elements 122, such as pedestal structures, which define one or more passageways for a cooling fluid, as well as an inlet 124 and an outlet 126 for the passageways, are cast. Alternatively, the microcircuit 120 can be machined, using any suitable technique known in the art, to form the elements 122 which define the passageway(s) for the cooling fluid and the inlet 124 and the outlet 126 for the passageway(s). As noted above, the exact configuration of the microcircuit 120 is a function of the end use of the turbine engine component. FIGS. 7A and 7B illustrate exemplary cooling microcircuit configurations which can be used in the present invention. An advantage to forming the microcircuit 120 in this manner is that it can be easily inspected prior to assembly of the airfoil portion 10.

After or before, the microcircuit 120 has been inspected, a cover plate 128 may be placed over it and joined to one or more of the elements 122.

In a similar fashion, a second microcircuit 120' may be formed on the internal wall surface 22 of the airfoil half 14. As with the first microcircuit 120, the second microcircuit 120' may be formed using any suitable technique known in the art and may have any number of cooling passageways. The microcircuit 120' also has a plurality of elements 122' defining one or more passageways for the cooling fluid, and an inlet 124' and an outlet 126' for the cooling fluid passageway(s). After or before the microcircuit 120' has been inspected, a cover plate 128' may be placed over the microcircuit 120' and joined to the elements 122'.

The cover plates 128 and 128' may be joined to the elements 122 and 122' of the respective microcircuits 120 and 120' using any suitable technique known in the art such as brazing, diffusion bonding, and welding. It should be noted that one advantage to this approach is that the cover plates 128 and 128' can easily be replaced if dirt plugging becomes a problem in the field.

After the microcircuits 120 and 120' have been formed and inspected and the cover plates 128 and 128' have been installed, the structures 100 are ready to be installed in a support structure (not shown) such as a disk. Adjacent ones of the structures 100 form an airfoil portion 10 by placing the airfoil half 12 in an abutting relationship with the second airfoil half 14 wherein mating surfaces 40, 42, and 44 on the airfoil half 12 contact or abut mating surfaces 46, 48, and 50 on the airfoil half 14. If desired, the airfoil halves 12 and 14 may be joined to each other using any suitable means known in the art such as by mechanical devices, diffusion bonding, transient liquid phase bonding, or solid state bonding.

As can be seen from the foregoing discussion, the technology employed in the present invention provides a simple means to implement microcircuit features in an airfoil design without the complexity associated with double-wall cooling designs. The present invention facilitates internal inspection, resolves the plugging problems, and improves performance by eliminating numerous leakage paths.

It is apparent that there has been provided in accordance with the present invention a manufacturable and inspectable microcircuit which fully satisfies the objects, means, and advantages set forth hereinbefore. While the present invention has been described in the context of specific embodiments, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A method for manufacturing a turbine engine component comprising the steps of:
   forming a first half of an airfoil portion of the turbine engine component;
   forming a first cooling microcircuit having at least one passageway on an exposed internal wall surface of said first half of said airfoil portion; and
   placing a cover plate over said first cooling microcircuit.

2. The method according to claim 1, wherein said first half is formed by casting.

3. The method according to claim 1, wherein said first cooling microcircuit forming step comprises forming said first cooling microcircuit by casting a plurality of elements forming said at least one passageway.

4. The method according to claim 1, wherein said first cooling microcircuit forming step comprises forming said first cooling microcircuit by machining a plurality of elements forming said at least one passageway.

5. The method according to claim 1, wherein said first cooling microcircuit forming step comprises forming said first cooling microcircuit with an inlet and an outlet.

6. The method according to claim 1, further comprising:
   forming a second half of said airfoil portion of said turbine engine component; and
   forming a second cooling microcircuit having at least one passageway on an exposed internal wall surface of said second half of said airfoil portion.

7. The method according to claim 6, wherein said second half is formed by casting.

8. The method according to claim 6, wherein said second cooling microcircuit forming step comprises forming said second cooling microcircuit by casting a plurality of elements forming said at least one passageway.

9. The method according to claim 6, wherein said second cooling microcircuit forming step comprises forming said second cooling microcircuit by machining a plurality of elements forming said at least one passageway.

10. The method according to claim 6, wherein said second cooling microcircuit forming step comprises forming said second cooling microcircuit with an inlet and an outlet.

11. The method according to claim 6, further comprising placing a cover plate over said second cooling microcircuit.

12. The method according to claim 6, further comprising placing said first half of said airfoil portion in an abutting relationship with respect to said second half of said airfoil portion.

13. The method according to claim 12, further comprising inspecting each of said microcircuits prior to said placement of said first half in said abutting relationship with said second half.

14. A method for manufacturing a turbine engine component comprising the steps of:
   forming a first half of an airfoil portion of the turbine engine component;
   forming a first cooling microcircuit having at least one passageway on an exposed internal wall surface of said first half of said airfoil portion;
   forming a second half of said airfoil portion of said turbine engine component;
   forming a second cooling microcircuit having at least one passageway on an exposed internal wall surface of said second half of said airfoil portion;
   said first half forming step comprising forming said first half with a first platform portion and a first fillet structure between an exterior surface of said first half of said airfoil portion and a surface of said first platform portion; and
   said second half forming step comprising forming said second half with a second platform portion and a second fillet structure between an exterior surface of said second half of said airfoil portion and a surface of said second platform portion.

15. A turbine engine component comprising:
   an airfoil portion formed by a first airfoil half in an abutting relationship with a second airfoil half;
   each of said first airfoil half and said second airfoil half having an internal wall surface and a cooling microcircuit formed on said internal wall surface; and
   a cover plate placed over each said microcircuit.

16. The turbine engine component according to claim 15, wherein said first airfoil half and said second airfoil half are separately cast structures.

17. The turbine engine component according to claim 15, wherein said first airfoil half has a first cast internal structure, said second airfoil half has a second cast internal structure, and said internal structures abut each other when said first airfoil half is placed in an abutting relationship with said second airfoil half.

18. A turbine engine component comprising:
   an airfoil portion formed by a first airfoil half in an abutting relationship with a second airfoil half;
   each of said first airfoil half and said second airfoil half having an internal wall surface and a cooling microcircuit formed on said internal wall surface; and
   a cast platform portion positioned between spaced apart ones of said first and second airfoil halves.

19. The turbine engine component according to claim 18, further comprising each airfoil half having an exterior surface and a fillet between said exterior surface and a surface of said platform.

* * * * *